United States Patent [19]
Blomquist

[11] Patent Number: 5,392,558
[45] Date of Patent: Feb. 28, 1995

[54] INSECT TRAP UTILIZING A FLEXIBLE CONTAINMENT MEANS HAVING AN ATTRACTANT THEREIN

[75] Inventor: Eric N. Blomquist, Phoenix, Ariz.

[73] Assignee: Farnam Companies, Phoenix, Ariz.

[21] Appl. No.: 161,483

[22] Filed: Dec. 6, 1993

[51] Int. Cl.$^6$ ............................................. A01M 1/20
[52] U.S. Cl. ...................................... 43/107; 43/122
[58] Field of Search ............... 43/107, 122, 118, 111, 43/113, 112

[56] References Cited

U.S. PATENT DOCUMENTS

| | | | |
|---|---|---|---|
| 1,534,771 | 4/1925 | Cvengros | 43/107 |
| 4,217,723 | 8/1980 | Hrebec | 43/122 |
| 4,218,842 | 8/1980 | Anderson | 43/122 |
| 4,501,088 | 2/1985 | Boisvert et al. | 43/122 |
| 4,706,410 | 11/1987 | Briese | 43/107 |
| 4,899,485 | 2/1990 | Schneidmiller | 43/107 |
| 5,226,254 | 7/1993 | MacMenigall | 43/107 |
| 5,231,791 | 8/1993 | Falkson | 43/107 |

Primary Examiner—P. Austin Bradley
Assistant Examiner—Chuck Y. Mah
Attorney, Agent, or Firm—Joseph H. Roediger

[57] ABSTRACT

An insect trap of the type utilizing a container beneath an entry element. The container is provided with an attractant liquid and the emitted odor induces insects to enter openings in the entry element. The entry element is provided with concave baffles to enhance the dissemination of attractant odors from the container. The container is preferably a bag secured to the entry element and depends therefrom in a manner which reduces the likelihood of escape by entrapped insects.

20 Claims, 3 Drawing Sheets

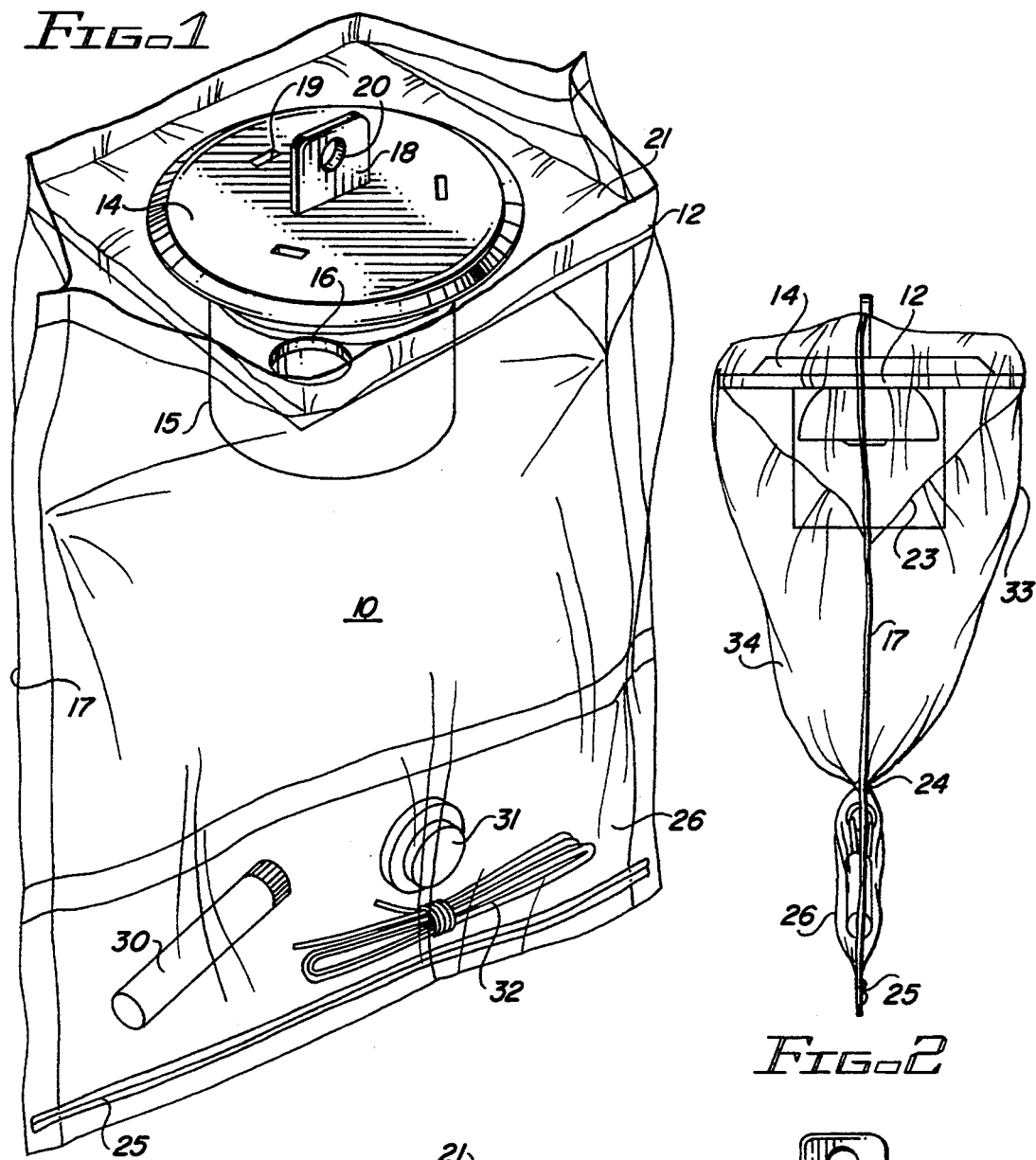
FIG. 1
FIG. 2
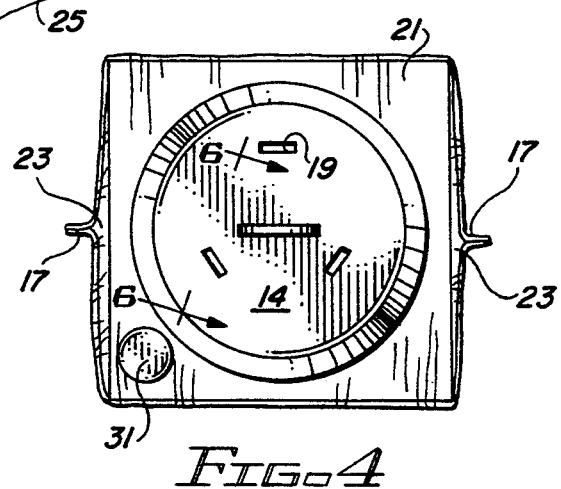
FIG. 4
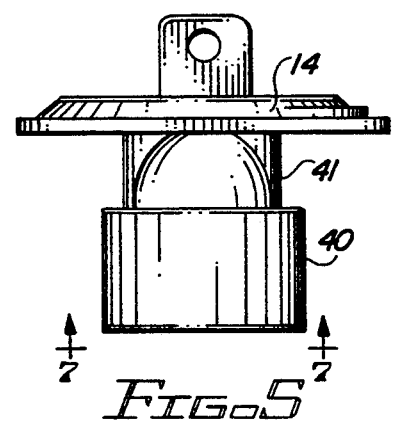
FIG. 5

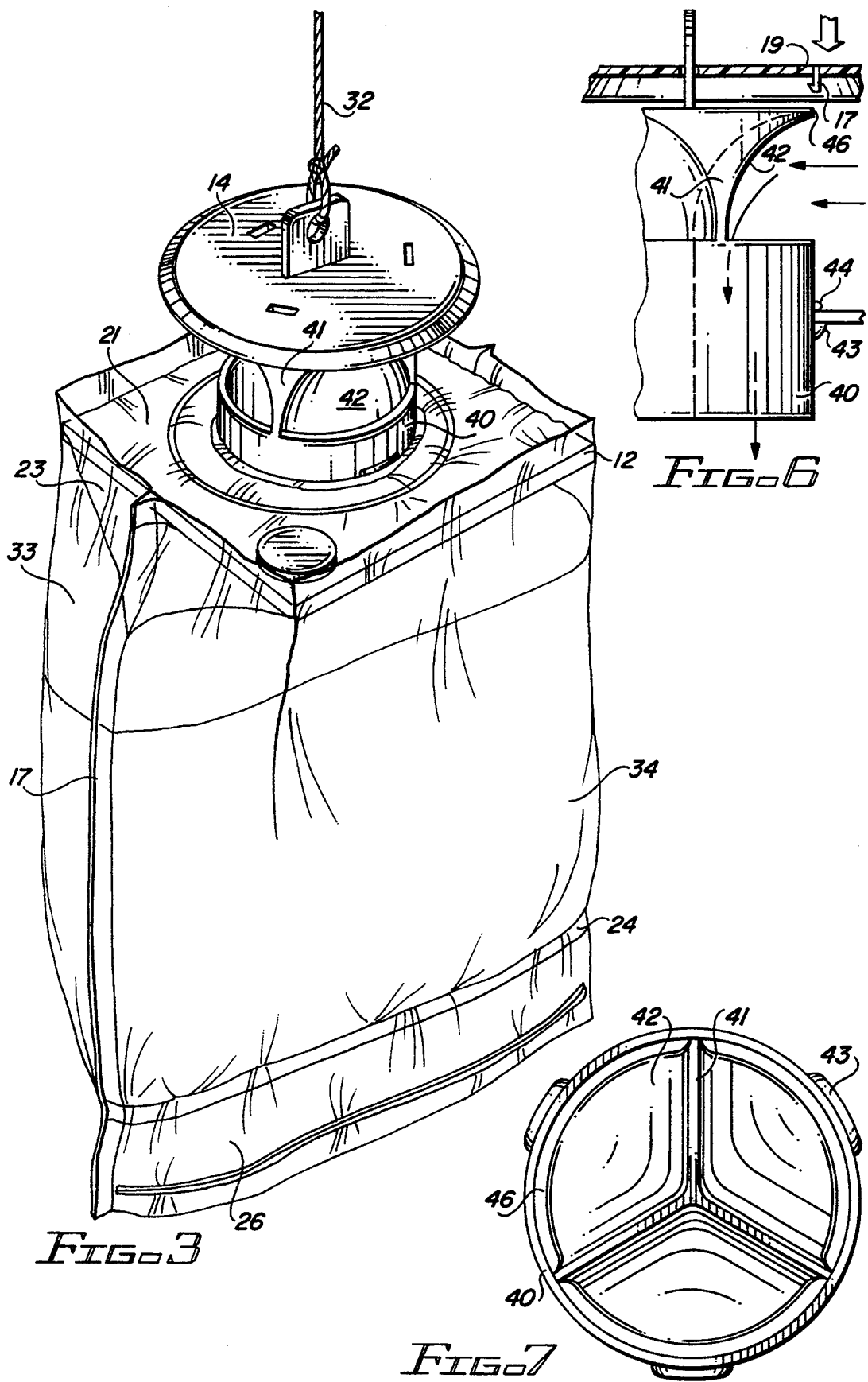

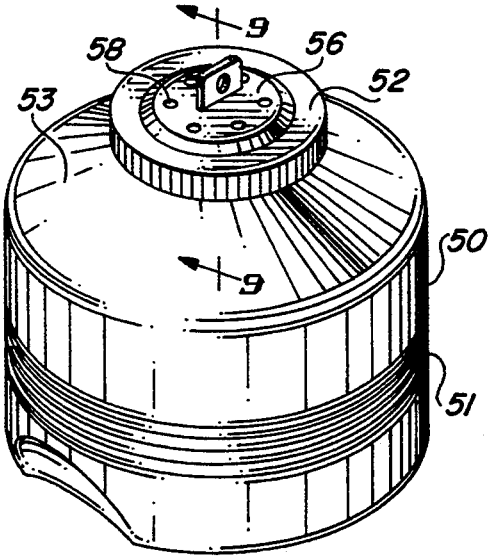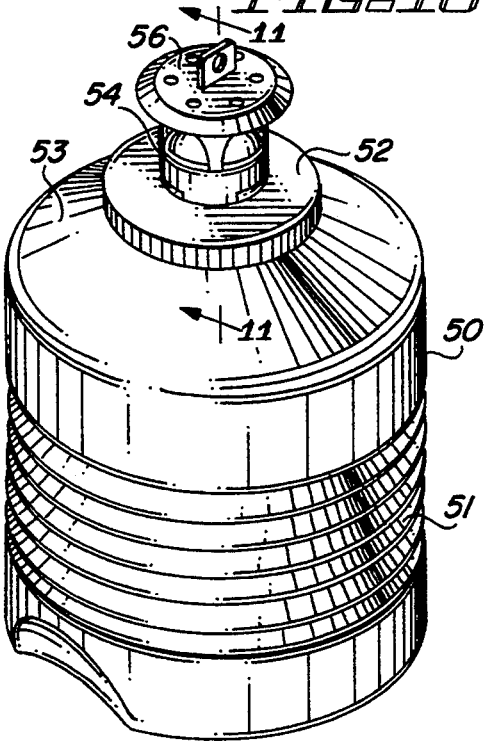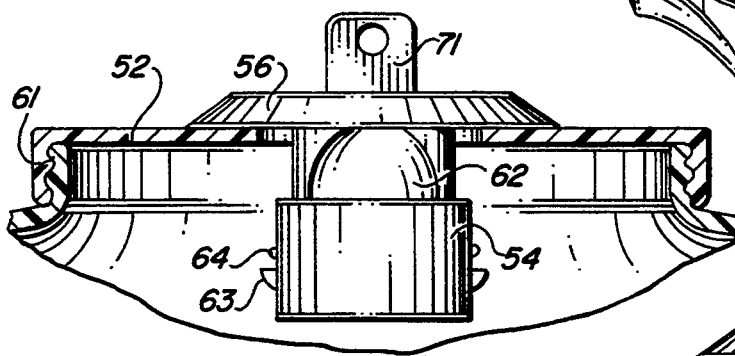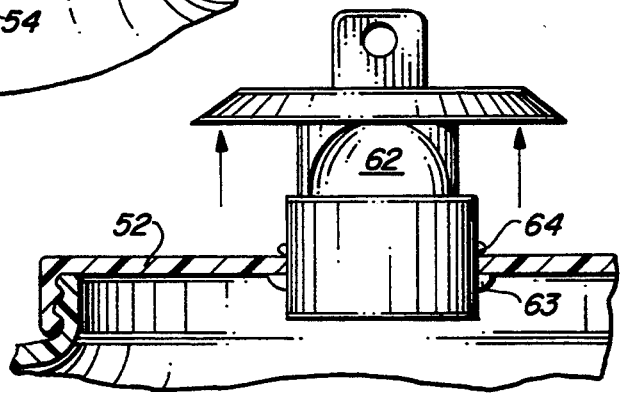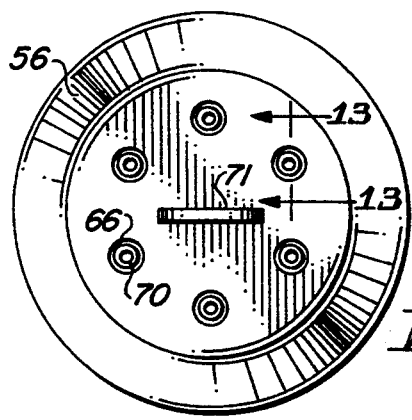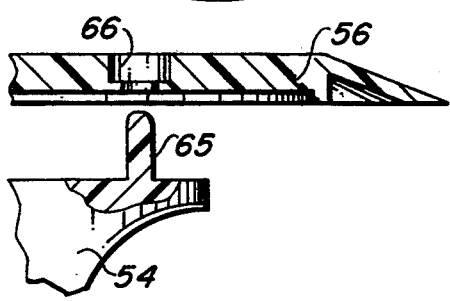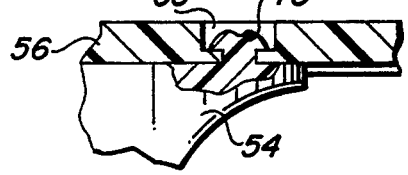

INSECT TRAP UTILIZING A FLEXIBLE CONTAINMENT MEANS HAVING AN ATTRACTANT THEREIN

BACKGROUND OF THE INVENTION

This invention relates to an insect trap utilizing a flexible containment means having an attractant therein.

Present day awareness of the harmful effects of insecticides has generated increasing interest in the use of containment type insect traps. In this type of trap, an attractant is used to induce the insect to enter into a structure from which it is extremely difficult to leave. The insect normally exhausts itself in its attempts to leave the containment means and expires therein. Thus, a reduction in the insect population is obtained without the use of an insecticide. The combination of entry element and containment means are often discarded as a unit. As a result, the user is not exposed to the attractant or the insects contained therein. This type of trapping device is increasingly in favor due to the fact that the user does not have to contact any chemical agents from the time of initiation of use of the device through completion of service.

Several types of attractants are made in concentrate form and subsequently diluted by the addition of water. When the attractant is located in the containment means, the addition of the water creates not only the solution that the solution that emits an airborne attractant, but also provides the medium in which the insect is collected.. In order to function as an effective insect trap, the entry element utilized must allow for the ease of entry of the insect. In addition, the construction of the device advantageously makes it extremely difficult for the insect to discover an exit path. The containment means holding the attractant provides the source of the airborne attractant which draws insects from the surrounding region and induces them to enter the trap.

While the efficacy of all insect trap of this type is determined in part by the particular attractant used in the containment means, the ability of the trap to disseminate the attractant beyond the immediate environs of the trap is also important. This type of insect trap normally relies on the movement of the ambient air to cause air to enter into the containment means through a first passageway and displace air mixed with the attractant odor from the containment means. The use of large area passageways promotes the flow of air from the containment means and assists in the dissemination of attractant odor in the region surrounding the trap. However, the enlarging of the area of the passageway tends to reduce the efficacy of the insect trap since insects having entered the containment means are more likely to discover an escape route from the trap rather than to expend their energies in unsuccessful attempts to leave.

Most insects are light responsive and they tend to travel upwardly toward a light source in their attempt to find an escape route from the device. Thus, the entry element and the surrounding portion of the top of the trap are preferably formed of opaque material. Since the entry element appears as a darkened region, the insect is less likely to seek exit through this structure. In contrast, the containment means is light transmissive in order to induce the insect to remain in proximity to the wall of the containment means. Many insects including the common house fly, Musca Domestica, instinctively seek upward-leading paths and move toward a light source seeking all exit route.

A typical containment bag type insect trap is disclosed in U.S. Pat. No. 4,873,787 wherein a flexible bag is used in combination with a tripartite entry structure. The entry structure utilizes a inverted conical member attached to the base of a vertical pillar. The pillar is provided with three vertical septa which define the channels through which the insects enter and the airborne attractant material is disseminated. The conical member is provided with slots to promote airflow and contains a relatively narrow orifice at the bottom which serves as the entry passage for entering insects. The bag depends from a planar platform, generally rectangular in shape. The bag includes lateral extensions from opposing sides of the platform to form the top closure of the containment bag. The lateral extensions of the upper portion of the bag disclosed therein slope downwardly while extending outwardly to the vertical edge of the containment bag. As a result, the insect within the bag tends to migrate upwardly along this curved path under the influence of the light from above. The insect is led by the curved shoulder formed within the bag back to the general area through which it entered. This lighted path tends to reduce the efficacy of the structure as the insects, sensitive to light from above, are led to the region which escape is possible.

Accordingly, the present invention is directed to an entry structure which contains large area passageways containing a baffle for promoting airflow through the containment means to assist in the dissemination of airborne attractant. In addition, the invention provides a flexible containment bag which is in general conformance with the platform of the entry element and vertically depends therefrom. As a result, the present invention essentially eliminates the curved upward path present in existing containment bags thereby removing this guide path for insects to the entry element. By providing a vertically depending containment bag, the likelihood of an insect being drawn toward the entry passageway is reduced thereby enabling larger area passageways to be utilized without substantially reducing the efficacy of the trapping device.

SUMMARY OF THE INVENTION

The present invention is directed to the provision of an insect trap utilizing a containment means for holding a reservoir of liquid attractant. The liquid attractant becomes airborne through the passage of air through the entry element and also provides the medium for ending the life of confined insects after they become exhausted.

The insect trap includes an entry element having a platform which can be used to support a containment bag depending therefrom. The platform contains a central opening and a peripheral region thereabout. A movable access element is located in the opening with the access element including at least two passageways therein. The passageways serve as the entryway for insects and promote the transmission of the airborne attractant from the containment means.

A containment bag depending from the entry element includes three sections. The upper end section is attached to the platform and contains opposing pleats which extend downwardly from the platform and are folded back to the level of the platform. A transition section affixed to the upper section receives the pleats therein. The pleats so formed and secured to the transition section draw the upper section and the transition section into conformance with the peripheral region of the platform. As a result, the upwardly sloping regions or shoulder of bags found in other structures are essentially eliminated from the present invention.

The bag terminates in a lower section which receives an attractant and the liquid medium therein. The platform is preferably provided with a port having a removable stopper therein for the addition of water to dilute the concentrated attractant. In addition, the attractant may be inserted through this port if it has not been previously incorporated in the containment bag. The attractant generates an odor that appeals to one or more of the instincts of the insect. To cause the airborne attractant to leave the bag, the access element mounted in the platform is provided with baffles in the passageways. The baffles are smooth concave surfaces which serve to deflect moving ambient air downwardly into the containment bag thereby expelling air containing the attractant from the bag. The concave baffles are oriented to effectively utilize even slight prevailing winds to disseminate the airborne attractant.

The entry element utilizes opaque material to effectively shield contained insects from light appearing from above the trap. The containment bag is light transmissive to assist in drawing the insects into the confined region. The top region of the bag conforms to the platform so that light above is not seen by insects in the bag. After entering the bag, the insects expend their energy within the bag and are not led to the region surrounding the entry passageways by an upwardly and inclined path leading toward a light source. Upon expending their energy, the insects become exhausted and fall into the liquid medium.

The access element is preferably movably mounted in the central opening in the platform and provided with a cap. The cap can be closed by urging the access element downwardly to its closed position. Thereafter, the entire assembly is disposed as a unit when the effect of the attractant is substantially reduced.

In another embodiment of the invention, the access element is movably mounted in a central opening in a platform which serves as a cap for an upright or free-standing container. The platform is provided with a threaded flange to engage a threaded opening on the container. The container preferred is a vertically expandable container having a plurality of circumferential bellows therein. The container is stored in a compressed condition until rendered operational by the addition of attractant and fluid thereto.

Further features and advantages of the present invention will become more readily apparent from the following detailed description of a preferred embodiment when taken in conjunction with the accompanying drawings.

BRIEF DESCRIPTION OF THE DRAWINGS

FIG. 1 is a view in perspective showing a preferred embodiment of the invention.

FIG. 2 is a side view of the embodiment of FIG. 1 with the access element in the closed position.

FIG. 3 is a view in perspective of the embodiment of FIG. 1 filled and in operating position.

FIG. 4 is a top view of the embodiment of FIG. 3.

FIG. 5 is a side view of the access element in an open position.

FIG. 6 is a partial side view of the access element taken along line 6—6 of FIG. 4.

FIG. 7 is a bottom view taken along line 7—7 of FIG. 4.

FIG. 8 is a view in perspective of a second embodiment of the invention.

FIG. 9 is a view in partial cross-section taken along line 9—9 of FIG. 8.

FIG. 10 is a view in perspective of the embodiment of FIG. 8 expanded for use.

FIG. 11 is a view in partial cross-section taken along line 11—11 of FIG. 10.

FIG. 12 is a top view of the access element of FIG. 8.

FIGS. 13 and 14 are views in partial cross-section showing constructional features of the access element of FIG. 8.

DESCRIPTION OF THE PREFERRED EMBODIMENT

Referring now to FIG. 1, the preferred embodiment of the insect trap utilizing a flexible bag is shown in its unfolded state prior to being charged with attractant and water. The insect trap is a single unit with several items stored in the pouch at the bottom thereof.

The embodiment of FIG. 1 includes a flexible containment bag 10 having a pouch 26 with a releasable seam 25 located beneath the region that is to be filled with the liquid medium, typically water, and the attractant. The upper portion of the containment bag 10 is provided with an entry element which includes a platform 12 having a centrally located access element 15 movably mounted therein. An overlying closure cap 14 is affixed to the top of the access element. The cap includes a vertical tab 18 having an opening 20 to facilitate hanging the insect trap when placed in use.

The pouch 26 is shown containing three items. A sealing plug 31 to be inserted into port 16 of platform 12 is one such element. A length of cord 32 to facilitate the hanging of the insect trap when it is charged with fluid and positioned for use is also provided. A sealed tube 30 is included in pouch 26 and contains the particular attractant composition utilized in the trap. A releasable seam 25 located at the bottom of pouch 26 permits the user to withdraw these items when placing the insect trap into use. The containment bag 10 is integral with the pouch 26 in the embodiment shown and contains a bottom seal so that when the containment bag is charged with fluid the releasable seal 25 does not determine the ability of the bag to handle the weight of the contained fluid.

The containment bag 10 includes an upper section 21, a transition section 33 and a bottom or storage section 34. The upper section 21 contains a central opening to receive the access element 15. Section 21 is secured to the upper surface of the platform 12 to form a seal about the opening through which access element 15 extends. The upper section 21 extends over the peripheral region of the platform 12 and on two opposing edges thereof is provided with pleats 23 which are shown more clearly in the side view of FIG. 2. The upper section 21 is rectangular in shape with two opposing edges being bonded at the edge of platform 12 to the adjacent edges of transition section 33. The section 21 is dimensioned to overhang the other pair of opposing edges with the pleats formed by folding back the corners. A vertical or edge seam 17 bonds the pleats to the transition section 33. As shown, the seams 17 extend upwardly to the plane of platform 12. The top portion of the pleats 23 is also bonded to the transition section 33 to provide a continuous seam along the top edge of the transition section 33. The material used in the formation of the bag 10 is a flexible light-transmissive plastic and the particular bonding technique will depend on the particular plastic material employed.

In the preoperative position shown in FIGS. 1 and 2, the combination of pleats and transition region bonded thereto result in the containment bag being in general conformance with the shape of the platform 12. The edge seams 17 extend up to the plane of the platform 12 to draw the opposing pleats of the upper section inwardly toward the platform edge. When the bag 10 is unfilled, the bottom section 34 tends to extend outwardly below the platform since it is a substantially planar piece of plastic. The filling of the containment bag with the liquid medium causes the transition region and the bottom section of the bag 10 to alter shape. The containment bag when filled is shown in FIG. 3 with the bottom section more closely assuming the contours of the transition region. The weight of the medium in the bag further draws the pleats and adjacent transition section into conformance with the platform 12. As a result, the edge seam 17 extends downwardly substantially orthogonally to the plane of the platform 12. As will later be explained, the use of the pleats in combination with the edge seam extending to or even slightly above the platform eliminates the formation of inclined shoulders in the containment bag. This vertical dependence from the peripheral region of the platform serves to promote the efficacy of the subject insect trap.

In FIG. 3, the cord 32 is attached to a fixture, not shown, which causes the access element to be drawn from the closed position of FIG. 1 to the open position shown. The cap 14 is attached to the underlying access element which includes partitions 41 terminating in a cylindrical base 40. The partitions 41 have a concave curved surface to form baffles 42 which lead downwardly into the cylindrical base. The platform 12 rests on supports formed on the outer surface of the cylindrical base. The weight of the fluid contained in the bottom section 34 of containment bag 10 draws the transition region 33 into conformance with the peripheral region of the platform. The pleats 23 are drawn inwardly against the platform edge. As shown, the pouch 26 has had its contents removed and plays no further part in the operation of the insect trap.

The general alignment of the pleats and the edge seam 17 is shown more clearly in FIG. 4 which is a top view of the filled embodiment of FIG. 3. The plug is shown inserted in the port 16 indicating that the bag has been filled with the combination of attractant and liquid medium. The slots 19 of cap 14 denote the location of underlying attaching hooks 17 which secure the cap to the access element as shown in FIG. 6. The outwardly protruding edges of the baffles 42 are press fit between the three spaced hooks 17 to provide support for the insect trap during normal use. The locking means for limiting the vertical movement of the platform and maintaining the position of the platform relative to the cylindrical base 40 includes a support ridge 43 and an overlying retaining ridge 44. The retaining ridge is approximately one third the size of the supporting ridge 43 to permit the edge of the platform to move thereover into position against the support ridge 43.

The access element is shown in FIGS. 5 and 7 as containing three concave baffles 42 separated by partitions 41 which extend upwardly from the cylindrical base 40. The orientation of the three baffles 42 is shown in the bottom view of FIG. 7. The baffles serve to promote airflow through the access element and at the same time provide ample opportunity for flying insects to enter into the containment bag. The use of the concave baffles to provide a large area semi-circular opening for the insects permits ready access to the source of the attractant odors. The base of the access element is essentially all insect passageway as seen in FIG. 7 since the dividers are narrow. In addition, an incident airstream encounters the baffle and is directed downwardly in the direction shown by the arrows of FIG. 6 to displace air presently in the containment bag. The inwardly and downwardly curved baffles reduce the air resistance of the access element so that even slight external air movement results in the passage of air through the access element and containment bag to disseminate the airborne attractant and enhance the efficacy of the present invention.

The access element with its associated cap 14 and platform 12 are formed of opaque material, typically rigid molded plastic, to present a darkened view to insects contained within the bag 10. It is generally recognized that insects are attracted to overlying light sources and by utilizing opaque materials in the fabrication of the platform, access element and overlying cap, the insect does not experience a light source from above. Furthermore, the use of the pleated upper section of the containment bag in combination with the seams drawing the transition section of the bag to the peripheral region of the platform essentially eliminates the upward guiding path provided by shoulders in loose fitting containment bags. Thus, the structural guide path back toward the entry element containing the passageways for the insects is not present. While the foregoing description has considered the use of a containment bag bonded to a discrete upper section, it should be noted that a single sheet of plastic with a central opening to receive the access element Call be utilized if desired. The construction of the containment bag and the positioning of the pleats is as previously discussed. Since the bag is a unitary piece in this embodiment, the top seam surrounding the platform can be eliminated.

Another embodiment of the invention is shown in FIGS. 8 and 10 wherein the flexible containment bag adapted for support from above is replaced by a collapsible cylindrical container 50. The container is wide-mouthed to receive a large area threaded cap and has flattened ends so that the container approximates a section of a cylinder. The side wall of the container is provided with a plurality of circumferential bellows 51 which allow the container to be compressed prior to use. The container is fabricated from a light-transmissive plastic which is sufficiently rigid to enable the container to be free-standing. While the container shown does not have the upwardly curved shoulder that provides a path to the entry element, it may be advantageous with other shape containers to coat region 53 with an opaque material to reduce the tendency of the entrapped insects to travel upward toward light sources and into the general region of the access element 54.

The access element 54 is provided with a closure cap 56 which contacts the surface of threaded cap 52 when the access element is urged into the container as shown in FIG. 8. The cap 52 is removably attached to the mating threads 61 of container 50 to permit the container to receive the attractant and fluid therein. The position of the access element within the container is shown in FIG. 9. The application of force to tab 71 raises the access element so that it extends above the threaded cap 52 with the baffles 62 exposed. As mentioned previously, the attractant odor is emitted via the baffles 62 which also define insect passageways into the container. The access element 54 is raised until the adjacent edge of cap 52 rest between the support ridge 63 and the retaining ridge 64. The access element remains in the position shown in FIG. 11 until pressure is applied to the tab or cap thereof to urge it downwardly to the position shown in FIG. 9.

The closure cap 56 of this embodiment is affixed to the access element 54 by the use of a number of vertical posts 65 which are received in corresponding holes 66 in cap 56. The preassembly registration of pins 65 and holes 66 is shown in FIG. 13. When the pins are received as shown in FIG. 14, the exposed end of the pin is laterally deformed to secure the cap 56 to the access element 54. The plan view of FIG. 12 shows six holes 66 spaced circumferentially around the tap 71. The ends 70 of the pins have been deformed to secure the cap to the access element. In practice, the access element and cap are each molded plastic elements. The cap is preferably placed on the access element prior to the affixation of the cap.

While the above description has referred to specific embodiments of the invention, it is to be noted that modifications and variations may be made therein without departing from the scope of the invention as claimed.

It is claimed:

1. An insect trap comprising:
   a) an entry element which includes:
      i. a platform for supporting a containment bag depending therefrom, said platform containing an opening and a peripheral region;
      ii. an access element movably mounted in the opening in said platform between open and closed positions, said element including at least two passageways therein; and
   b) a containment bag depending from said entry element which includes:
      i. an upper end section attached to the platform, said upper end section containing opposing pleats extending downwardly from the platform;
      ii. a transition section affixed to the upper section and provided with opposing edge seams, said seams extending vertically upward to the platform and being affixed to the pleats of the upper end section, said pleats drawing the upper section and the transition section into conformance with the peripheral region of the platform; and
      iii. a lower section of the bag for receiving an attractant therein, the conformance of the upper end section of the bag to the peripheral region of the platform being enhanced by the weight of attractant in the bag.

2. The invention in accordance with claim 1 wherein said upper end section includes opposing pairs of pleats extending downwardly from the platform, each pair of said pleats being affixed to a vertical seam of the transition region.

3. The invention in accordance with claim 2 wherein said entry element is opaque and said containment bag is light-transmissive.

4. The invention in accordance with claim 3 further comprising a closure element attached to the access element for engagement with the platform when the access element is in a closed position.

5. The invention in accordance with claim 4 wherein said containment bag is comprised of three discrete parts; the upper section which is rectangular in area and includes the opposing pleats, and front anti back panels which include the transition and lower sections, said three elements being joined by side and bottom seams, said side seams extending downwardly from the platform.

6. The invention in accordance with claim 5 wherein said upper section is affixed to the peripheral region of the platform.

7. The invention in accordance with claim 6 wherein the passageways of the access element are provided with flow directing means to promote the entry of air into the bag.

8. The invention in accordance with claim 7 wherein said flow directing means comprises a curved baffle located in each passageway.

9. The invention in accordance with claim 8 wherein said access element is movably mounted in the opening in said platform and further comprising locking means for maintaining the access element in an open position.

10. The invention in accordance with claim 9 further comprising a pouch connected to the lower section for storing attractant therein.

11. An insect trap comprising:
    a) an opaque entry element which includes:
       i. a platform having a central opening and a peripheral region thereabout.
       ii. an access element mounted in said central opening for movement between open and closed positions, said element containing at least two passageways therein, each passageway being angularly oriented to convey moving air through the platform;
       iii. means affixed to said access element for maintaining said access element in an open position: and
    b) light-transmissive containment means attached to said platform and located therebeneath, the moving air entering and leaving the containment means from said passageways.

12. The invention in accordance with claim 11 wherein the passageways each contain a baffle for deflecting moving air downwardly into said containment means.

13. The invention in accordance with claim 12 wherein said platform contains a circular opening and the access element is cylindrical.

14. The invention in accordance with claim 13 wherein said access element contains three passageways, each passageway having a curved baffle to direct moving air downwardly into the bag thereby promoting movement of air through said containment means.

15. The invention in accordance with claim 14 wherein the curved baffles extend downwardly into said access element beneath the platform, each passageway occupying one-third of the cylindrical access element.

16. The invention in accordance with claim 15 further comprising a closure cap affixed to the access element, said closure cap moving into contact with said platform when the access element is in the closed position.

17. The invention in accordance with claim 16 wherein the curved baffles form semicircular openings for the passageways.

18. The invention in accordance with claim 17 wherein the platform is rectangular and said containment means is a flexible bag secured to said platform proximate the opening therein, whereby the platform is located within the bag.

19. The invention in accordance with claim 17 wherein said containment means is a free-standing container having a central opening and said platform comprises a cap for the opening in said container.

20. The invention in accordance with claim 19 wherein said cap is removably affixed to said container.

* * * * *